(12) United States Patent
Asada

(10) Patent No.: US 7,436,154 B2
(45) Date of Patent: Oct. 14, 2008

(54) VEHICLE GENERATOR CONTROL DEVICE

(75) Inventor: Tadatoshi Asada, Anjo (JP)

(73) Assignee: Denso Corporation, Kariya (JP)

( * ) Notice: Subject to any disclaimer, the term of this patent is extended or adjusted under 35 U.S.C. 154(b) by 14 days.

(21) Appl. No.: 11/783,728

(22) Filed: Apr. 11, 2007

(65) Prior Publication Data
US 2007/0241724 A1 Oct. 18, 2007

(30) Foreign Application Priority Data
Apr. 17, 2006 (JP) ............... 2006-113788

(51) Int. Cl.
H02P 7/06 (2006.01)
H02P 11/00 (2006.01)
H02P 9/00 (2006.01)
(52) U.S. Cl. .......................... 322/24; 322/28
(58) Field of Classification Search ............ 322/24, 322/28, 46, 77, 44
See application file for complete search history.

(56) References Cited
U.S. PATENT DOCUMENTS
5,296,997 A * 3/1994 Betton et al. ............... 361/92
5,491,400 A * 2/1996 Iwatani et al. .............. 322/28
6,037,753 A * 3/2000 Uematsu et al. ............ 322/29
6,462,517 B2 * 10/2002 Asada ...................... 322/28
7,253,591 B2 * 8/2007 Takahashi ................. 322/59
2006/0186862 A1* 8/2006 Takahashi ................. 322/28
2006/0221525 A1* 10/2006 Konishi .................. 361/93.1

FOREIGN PATENT DOCUMENTS
JP A-62-203599 9/1987
JP 2006050695 A * 2/2006

* cited by examiner

Primary Examiner—Julio Gonzalez
(74) Attorney, Agent, or Firm—Oliff & Berridge, PLC

(57) ABSTRACT

A vehicle generator control device includes a transistor chopper type exciting circuit for supplying an excitation current to a vehicle-mounted electric generator drivable by an engine of the motor vehicle. The exciting circuit comprises a bridge circuit having a first pair of opposing arms formed of respective power transistors and a second pair of opposing arms formed of respective diodes. One of the power transistors is connected to a ground potential of the vehicle-mounted electric generator and the other power transistor is connected to an output terminal of the vehicle-mounted electric generator. When the engine is in a non-operating state, the one transistor is set in an on state and the other power transistor is set in an off state.

5 Claims, 4 Drawing Sheets

VEHICLE GENERATOR CONTROL DEVICE

CROSS REFERENCE TO RELATED APPLICATION

The present application is based on and claims priority from Japanese Patent Application 2006-113788, filed Apr. 17, 2006, the contents of which are incorporated herein by reference.

BACKGROUND OF THE INVENTION

1. Field of the Invention

The present invention relates to a vehicle generator control device for controlling the output voltage of an AC generator installed in a motor vehicle such as passenger cars, trucks or the like.

2. Description of the Related Art

In recent years there has been an increasing demand for the effective use of the output of a vehicle generator driven for rotation by an engine installed in a motor vehicle. To meet the demand, proposals have been made wherein a "transistor chopper" type exciter circuit is provided to use a rotor excitation current as a regenerative current to be supplied to the battery for the purpose of achieving an effective use of the generator output.

One example of such prior proposals is disclosed in Japanese Patent Laid-open Publication (JP-A) No. 62-203599, which comprises a bridge circuit having a pair of opposing arms constituted by respective transistors. When the vehicle engine is in the non-operating state, the transistors of the bridge circuit are switched to the off state with the result that the field winding of a rotor of the vehicle generator is in a floating state from the viewpoint of electric potential. In cold climates, for example, it may occur that after traveling of the vehicle, the vehicle generator is left to stand as being wet with water from melted snow containing a snow-melting agent. In this instance, if a leakage current occurs between transistor terminals connectable to a battery terminal of the rotor, the rotor potential becomes equal to the battery potential, allowing the current to flow between the rotor and a stator core having ground potential. As a result, the rotor and the stator core, which face across a very narrow space so-called "air gap", get rusty, deteriorating the environment resistance and reliability of the vehicle generator. This phenomenon becomes prominent especially when the vehicle generator is used at a high voltage (42 V, for example). Due to the foregoing difficulties, the vehicle generator equipped with a transistor chopper type exciter circuit has not come into widespread use, although it is multifunctional under normal conditions.

SUMMARY OF THE INVENTION

It is accordingly an object of the present invention to provide a vehicle generator control device, which uses a transistor chopper type exciter circuit to supply an excitation current to a vehicle generator and is capable of improving the environmental resistance and reliability of the vehicle generator.

According to the present invention, there is provided a vehicle generator control device comprising: a transistor chopper type exciting circuit for supplying an excitation current to a vehicle-mounted electric generator drivable by an engine of the motor vehicle, the exciting circuit including a bridge circuit having a first pair of opposing arms formed of respective power transistors and a second pair of opposing arms formed of respective diodes, one of the power transistors being connected to a ground potential of the vehicle-mounted electric generator and the other power transistor being connected to an output terminal of the vehicle-mounted electric generator, wherein when the engine is in a non-operating state, the one transistor is set in an on state and the other power transistor is set in an off state. With this arrangement, since the power transistor on the earth or ground level side of the bridge circuit is positively switched to the on state, it is possible to prevent the electric potential from floating. As a result, even if a leakage current occurs under the condition that the vehicle-mounted electric generator is wet with water from melted snow containing a snow-melting agent, the leakage current is allowed to flow to the ground via the power transistor while being switched to the on state. This will ensure that a rotor of the vehicle-mounted electric generator is substantially free from corrosion and the vehicle-mounted electric generator has an increased environmental resistance and improved reliability.

Preferably, the power transistors of the transistor chopper type exciter circuit comprise voltage-driven power transistors. Unlike bipolar transistors, the voltage-driven power transistors do not require a drive signal current. It is therefore possible to drive the ground side power transistor with reduced dark current involved in a drive circuit provided for the power transistor.

The vehicle generator control device may further comprise operating state determination means for determining whether the engine is in an operating state or not, drive means for setting the one power transistor in the on state, and a standby power supply that supplies electric power to the operating condition determining means and the drive means even when the engine is in the non-operating state. With this arrangement, since both of the operating state determination means and the drive means are drivable by the same power supply (standby power supply), the vehicle generator control device is relatively simple in construction and ensures that the leakage current flows to the ground when the engine is in the non-operating state.

Preferably, the vehicle generator control device further comprises voltage stepdown means disposed between the drive means and the one power transistor for switching the one power transistor to the on state at a voltage lower than an output voltage of the standby power supply. In general, the engine non-operating time (during which the engine is in the non-operating state) is longer than the engine operating time (during which the engine is in the operating state) and, hence, the operating time of the ground side power transistor becomes longer than that of the output terminal side power transistor. However, by stepping down the drive voltage, an operation load on the ground side power transistor can be reduced, allowing for a long service life of the ground side power transistor without deterioration of the reliability. Even through the drive voltage is stepped down, the leakage current is still allowed to flow to the ground as long as the stepdown voltage is set to be higher than an operation threshold value of the power transistors.

Among the diodes forming the other pair of opposing arms of the bridge circuit, at least one diode which is connected to the ground potential of the vehicle-mounted electric generator preferably comprises a body diode of a power transistor, and the power transistor having the body diode is set to an on state when the engine is in the non-operating state. With this arrangement, since opposite ends of the field winding of the stator are connected to the ground via the power transistors having the respective body diodes, it is possible to clamp the stator at the ground potential with increased reliability. Even when a leakage current occurs at the power transistor on the

DETAILED DESCRIPTION OF THE PREFERRED EMBODIMENT

Figure 1:
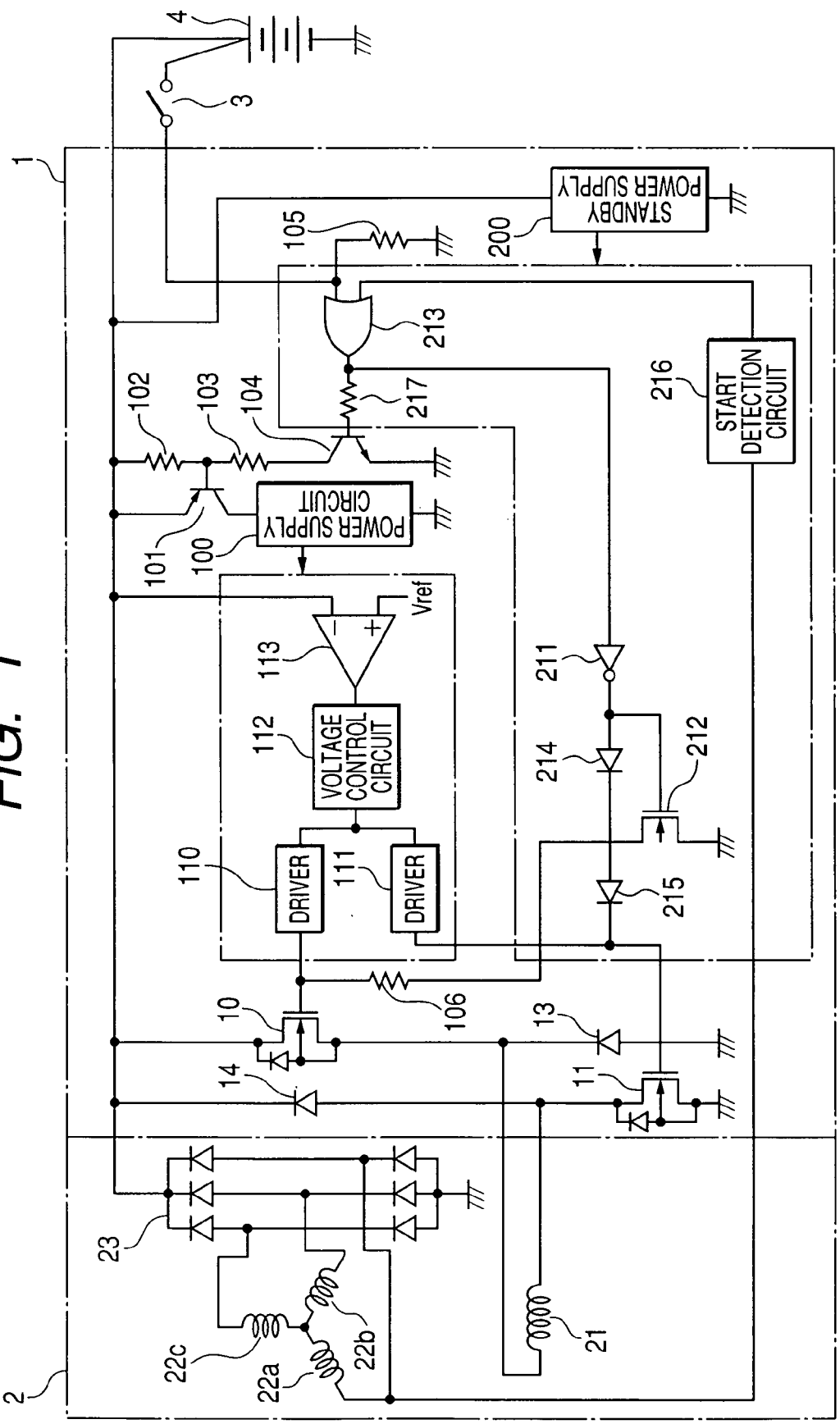
FIG. 1 is a circuit diagram showing the general configuration of a vehicle generator control device according to an embodiment of the present invention.

Referring now to the drawings and FIG. 1 in particular, there is shown a vehicle generator control device 1 according to an embodiment of the present invention. The vehicle generator control device 1 shown in FIG. 1 is configured to control a vehicle-mounted electric generator (hereinafter referred to for brevity as "vehicle generator") 2 so that the voltage appearing across the output terminal of the vehicle generator 2 and the common system ground potential is brought into consistency with a predetermined adjustment voltage preset value (14 V, for example). The vehicle generator 2 comprises a rotor having a field winding 21, a stator having three divided stator windings 22a, 22b and 22c wound thereon in three phase to jointly form a three-phase stator winding, and a full-wave rectifier 23 which rectifies the three-phase AC output voltages from the divided stator windings 22a, 22b and 22c of the three-phase stator winding into a DC voltage. The output voltage of the vehicle generator 2 is controlled by the vehicle generator control device 1 through proper control of on/off switching of the field current to be supplied to the field winding 21. The output terminal of the vehicle generator 2 is connected to a battery 4 so that the output current from the vehicle generator 2 is supplied to the battery 4 for recharging the battery 4.

The configuration and operation of the vehicle generator control device 1 will be described below in greater detail with reference to FIG. 1. The vehicle generator control device 1 comprises power transistors, i.e., MOS FETs (Metal-Oxide Semiconductor Field Effect Transistors) 10 and 11, diodes 13, 14, 214 and 215, a power supply circuit 100, a PNP transistor 101, resistors 102, 103 and 217, an NPN transistor 104, drivers 110 and 111, a voltage control circuit or controller 112, a voltage comparator 113, a standby power supply circuit 200, an inverter circuit 211, an FET 212, an OR circuit or gate 213, and a start detection circuit 216.

The power MOS FETs 10 and 11 together form one pair of opposing arms of an H-bridge circuit and the diodes 13 and 14 together form the other pair of opposing arms of the H-bridge circuit. When the power MOS FETs 10 and 11 are switched to the on state, an excitation current is supplied to the field winding 21. Alternatively, when the power MOS FETs 10 and 11 are switched to the off state, a back flow of current is generated, flowing through the diodes 13 and 14 into the battery 4 to regenerate the battery 4.

One driver 110 is provided to drive the power MOS FET 10 connected to an output terminal side of the vehicle generator 2 (the power MOS FET 10 will be sometimes referred to as "output terminal side power MOS FET 10"). More specifically, the driver 110 inputs a high level drive signal to the gate of the power MOS FED 10 to set the power MOS FED 10 to the on state. The other driver 111 is provided to drive the power MOS FET 11 connected to an input terminal side (ground potential side) of the vehicle generator 2 (the power MOS FET 11 will be sometimes referred to as "ground side power MOS FET 11"). The driver 111 inputs a high level drive signal to the gate of the power MOS FET 11 to set the power MOS FET 11 to the on state. The voltage comparator 113 has a negative input terminal to which an output voltage from the vehicle generator 2 is applied, and a positive input terminal to which an adjustment voltage Vref is applied. The voltage comparator 113 compares the output voltage of the vehicle generator 2 with the adjustment voltage Vref and produces a high level output signal when the output voltage of the vehicle generator 2 is lower than the adjustment value Vref and produces a low level output signal when the output voltage of the vehicle generator 2 is higher than the adjustment voltage Vref. The voltage controller 112 produces a PWM (pulse width modulation) control signal in accordance with the output signal from the voltage comparator 13 and supplies the PWM control signal to the drivers 110, 111. The H-bridge circuit, drivers 110, 111, voltage controller 112 and voltage comparator 113 together form a transistor chopper type exciter circuit, which supplies an excitation current to the field winding 21 of the vehicle generator 2.

The standby power supply circuit 200 supplies operating power to part of the circuit even when the engine is in a non-operating state (namely, the vehicle generator 2 is in a non-generating state). In the illustrated embodiment, such circuit part includes the inverter circuit 211, the OR gate 213, and the start detection circuit 216.

The start detection circuit 216 constitutes an operating state determining means that determines whether the engine is in the operating state or in the non-operating state. More particularly, the start detection circuit 216 first detects, on the basis of the frequency of a phase voltage (peek voltage) of either one of the divided stator windings 22a, 22b and 22c, the presence of an electromotive force (EMF) generated by the vehicle generator 2 and then determines, on the basis of the result of detection of the EMF, whether the engine is in the operating state or not. For instance, when the frequency of a phase voltage, which exceeds a predetermined reference level, is not more than a value corresponding to 200 rpm (i.e., the speed of rotation of the generator 2 determined by the phase voltage frequency), the start detection circuit 216 determines that the engine is in the non-operating state. When the frequency of the phase voltage is not less than a value corresponding to 400 rpm (i.e., the speed of rotation of the generator 2 determined by the phase voltage frequency), the start detection circuit 216 determines that the engine is in the operating state. By thus providing a criterion with hysteresis, the determining operation can be achieved with increased stability.

The OR gate 213 has one input terminal connected to an output terminal of the start detection circuit 216, the other input terminal of the OR gate 213 being connected to a junction between the key switch 3 and a pulldown resistance 105. When a high level signal is supplied to at least one of the input terminals, the OR gate 213 emits a high level output signal.

(When the Engine is in the Operating State)

When the key switch 3 is turned on to start the engine, the vehicle generator 2 starts to generate electric power due to energization of the field winding 21 with residual magnetic flux. In this instance, the start detection circuit 216 determines that the engines is in the operating sates and outputs a high level signal. Thus, the OR gate 213 while operating by power supplied from the standby power supply 200 emits a high level output signal to the base of the NPN transistor 104 whereupon the NPN transistor 104 conducts to thereby lower the electric potential at the junction between the two resistors 102 and 103 that are connected to the collector of the NPN transistor 104. This causes the PNP transistor to conduct, allowing the power supply circuit 100 to start supplying an operation voltage to the drivers 110 and 111, voltage controller 112, and voltage comparator 113. After this, operation of the transistor chopper type exciter circuit comprised of the H-bridge circuit and the voltage controller 112 is enabled so that control is performed in such a manner that the output voltage of the vehicle generator 2 is brought into consistency with the predetermined adjustment voltage and a back flow of current flowing through the field winding 21 is supplied as a regenerative current to the battery 4.

(When the Engine is in the Non-operating State)

Alternatively, when the key switch 3 is turned off, the engine stops moving. This causes the vehicle generator 2 to stop generation of electric power whereupon the start detection circuit 216 emits a low level output signal to one input of the OR gate 213. In this instance, since the start detection circuit 216, OR gate 213, and inverter circuit 211 are still able to operate, by electric power supplied from the standby power supply 200, the low level output signal of the start detection circuit 216 supplied to one input of the OR gate 213 set the output of the OR gate 213 at the high level (i.e., a high logic level potential). At this time, the inverter circuit 213 serving as a drive means emits a high level output signal, which is then supplied through the diodes 214 and 215 (which function as a voltage stepdown means) to the gate of the gate side power MOS FET 11 to thereby switch the power MOS FET 11 to the on state. With this switching of the power MOS FET 11 to conduction, the field winding 21 of the vehicle generator 2 is grounded. The high level output signal from the inverter circuit 211 is also supplied to the gate of the FET 212 so that when the FET 212 conducts, a gate charge of the power MOS FET 10 connected via a drain resistance 106 to the FET 212 is discharged and, hence, the power MOS FET 10 is forcibly set to the off state.

As thus far described, when the vehicle engine is in the non-operating state, the ground side power MOS FET 11, which forms together with the output terminal side power MOS FET 10 one pair of opposing arms of the H-bridge circuit, is positively switched to the on state. Thus, the electric potential of the field winding 21 is prevented from floating with the result that even if a leakage current occurs in the vehicle generator 2 while the vehicle generator 2 is left wetted with water from melted snow containing a snow-melting agent, the leakage current is allowed to flow through the conducting power MOS FET 11 to the ground. It is therefore possible to prevent corrosion of the rotor and stator of the vehicle generator 2, increase the environmental resistance of the vehicle generator 2 and improve the reliability of the vehicle generator 2.

Furthermore, since the power MOS FETs 10 and 11 contained in the transistor chopper type exciter circuit are of the voltage-driven type, this arrangement obviates the need for a current for drive signal as required in bipolar transistors and makes it possible to drive the ground side power MOS FET 11 with reduced dark current involved in the drive circuit (inverter circuit 211).

Additionally, since the start detection circuit 216, OR gate 213 and inverter circuit 211 can be operated by the same standby power supply 200, the vehicle generator control device 1 is relatively simple in construction and is able to let the leakage current to flow to the ground when the engine is in the non-operating state.

Furthermore, by virtue of the diodes 214, 215 provided between the inverter circuit 211 and the power MOS FET 11 as a voltage stepdown means, the drive voltage for the power MOS FET 11 is set to be lower than an operating voltage supplied from the standby power supply 200 to the inverter circuit 211. In general, the engine non-operating time (during which the engine is in the non-operating state) is longer than the engine operating time (during which the engine is in the operating state) and, hence, the operating time of the ground side power MOS FET 11 becomes longer than that of the output terminal side power MOS FET 10. However, by stepping down the drive voltage, an operation load on the ground side power MOS FET 11 can be reduced, allowing for a long service life of the ground side power MOS FET 11 without deterioration of the reliability. Even through the drive voltage is stepped down, the leakage current is still caused to flow to the ground as long as the stepdown voltage is set to be higher than an operation threshold value of the power MOS FET 11.

Given that the operating voltage supplied from the standby power supply 200 is 5 V and the forward voltage drop of each of the diodes 214 and 215 is 0.7 V (=VF), a drive voltage of 3.6 V (=5-1.4 V) is applied to the gate of the power MOS FET 11. Provided that the power MOS FET 11 has a threshold voltage Vth of 1.2 V, the 3.6 V drive voltage is still high enough to ensure that the leakage current flows to the ground.

Figure 2:
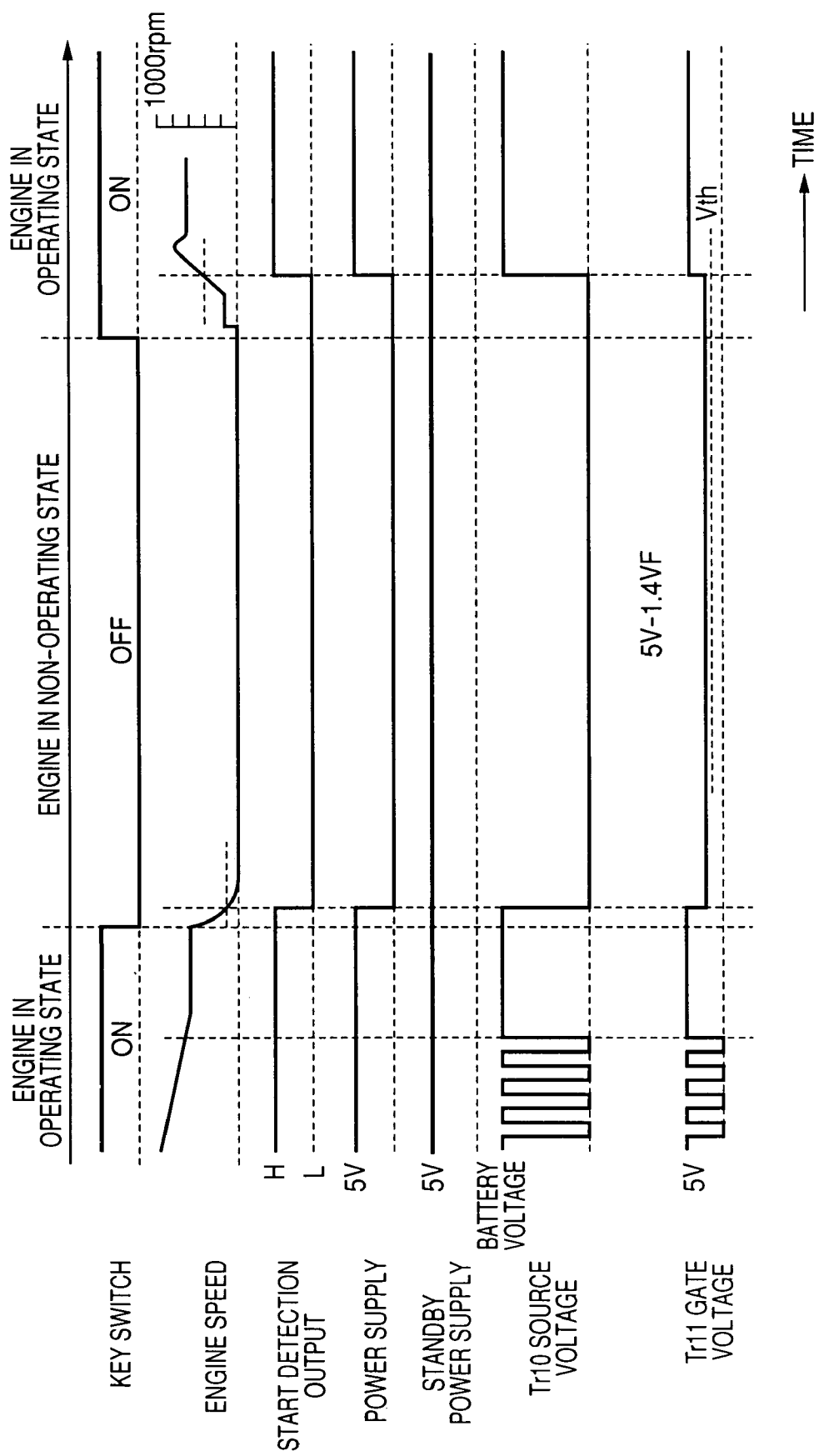
FIG. 2 is a timing chart illustrative of the operation of the vehicle generator control device taken in conjunction with the operating and non-operating states of a vehicle engine.

FIG. 2 is a timing chart illustrative of operation of the vehicle generator control device taken in conjunction with the operating state and the non-operating state of the engine. In FIG. 2, the term "KEY SWITCH" represents the on/off state of the key switch 3; "ENGINE SPEED", a speed of rotation of the engine; "START DETECTION OUTPUT", an output signal from the start detection circuit 216; "POWER SUPPLY", an operating voltage generated by the power supply circuit 100; "STANDBY POWER SUPPLY", an operating voltage generated by the standby power supply; "Tr10 SOURCE VOLTAGE", a source voltage of the power MOS FET 10; and "Tr11 GATE VOLTAGE" a gate voltage of the power MOS FET 11. As shown in FIG. 2, when the engine is in the non-operating state, the power MOS FET 11 is set in the on state with the gate applied with a voltage of 3.6 V (5 V-1.4 VF).

Figure 3:
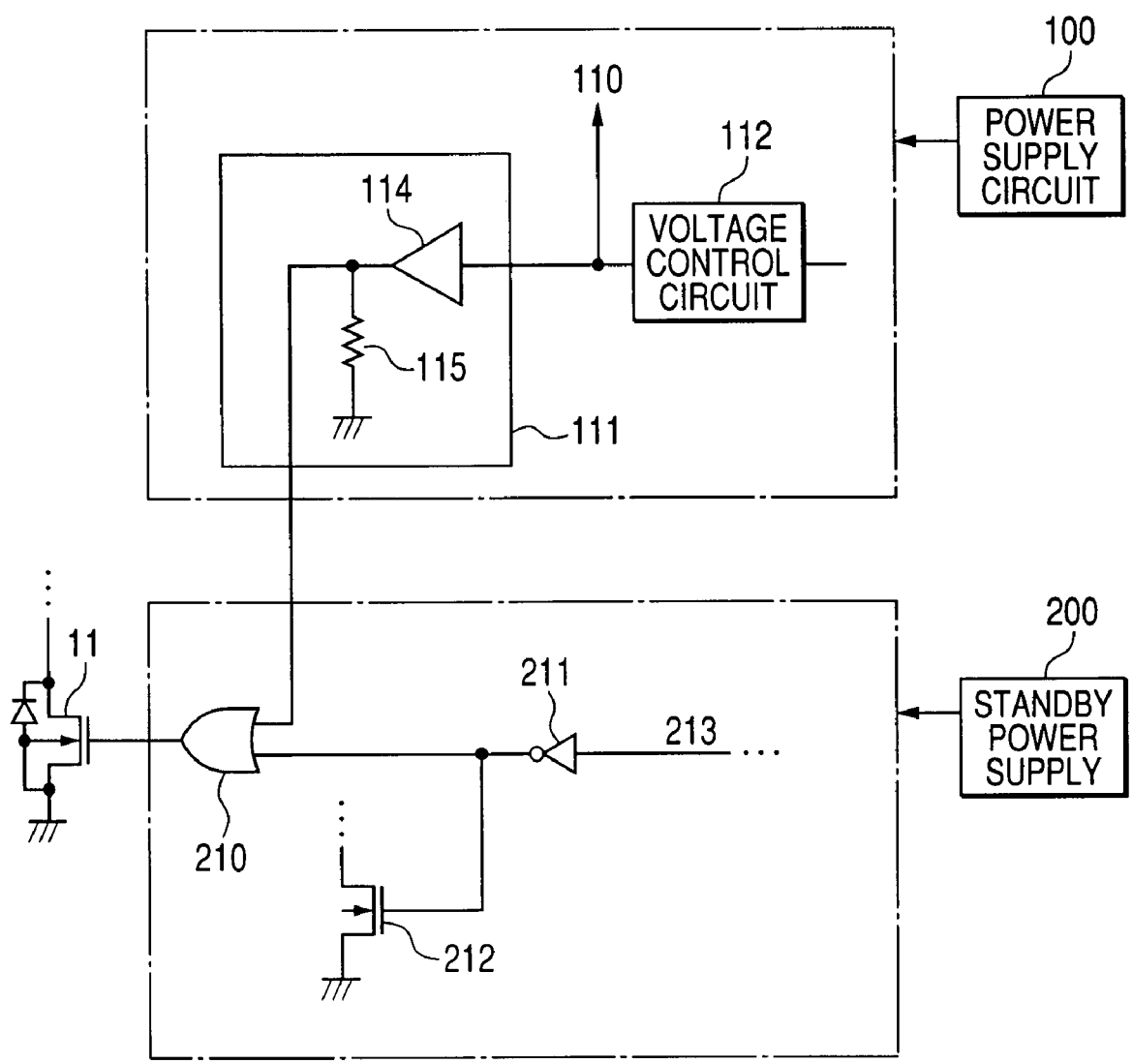
FIG. 3 is a circuit diagram showing a part of the vehicle generator control device according to a modification of the present invention.

FIG. 3 is a circuit diagram showing a part of the vehicle generator control device according to a modification of the present invention. The modified part of the vehicle generator control device shown in FIG. 3 differs from a corresponding part of the vehicle generator control device 1 of FIG. 1 in that the two diodes 214 and 215 connected in series are replaced by a single OR gate 210, and the output signal from the driver 111 is supplied to one input of the OR gate 210.

As shown in FIG. 3, the driver 111 is formed by a buffer circuit 114 and a pulldown resistance 115. At the start of the engine, the power supply circuit 100 is activated to start supplying of an operating voltage. When the exciting current supplied to the field winding 21 is to be interrupted, the voltage control circuit 112 supplies a low level output signal to the buffer circuit 114. As a consequence, the output signal of the OR gate 210 is at the low level and, hence, the power MOS FET 11 is set to the off state. By contrast, when the excitation current is to be supplied to the field winding 21, the voltage control circuit 112 supplies a high level output signal to the buffer circuit 114. As a consequence, the output signal of the OR gate 210 is at the high level and, hence, the power MOS FET 11 is set to the on state. Furthermore, when the engine is in the non-operating state, the buffer circuit 114 is set in the off state due to interruption of the supply of an operating current from the power supply circuit 100. The electric potential at the output terminal of the buffer circuit 114 is pulled down or lowered by the pulldown circuit 115 to the low level. As a result, the OR circuit 210 operates depending on the output signal from the inverter circuit 211 which is operating by the operating voltage supplied from the standby power supply 200.

Figure 4:
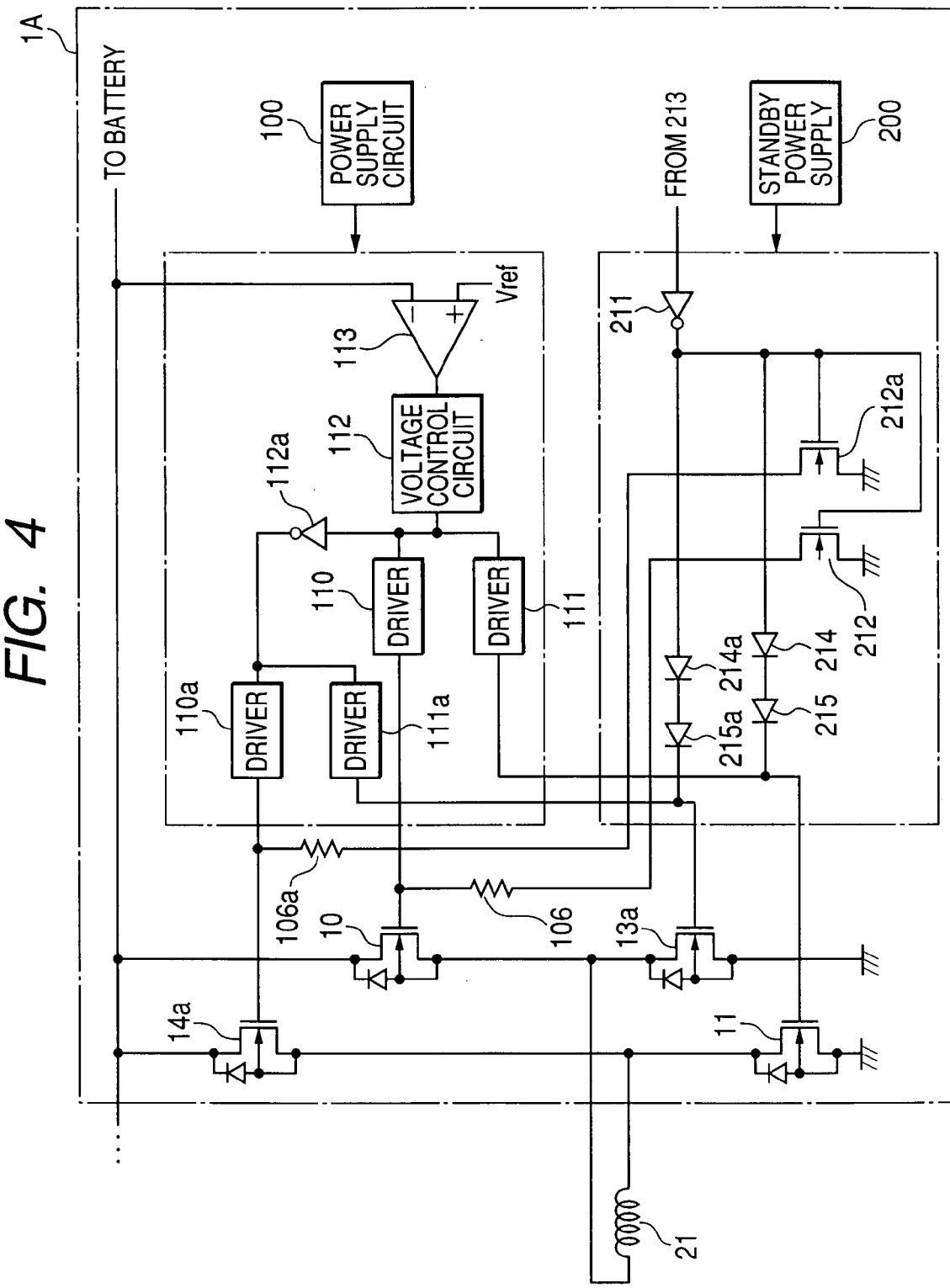
FIG. 4 is a view similar to FIG. 1, but showing the general configuration of a vehicle generator control device according to another modification of the present invention.

FIG. 4 shows another modified form the vehicle generator control device 1 according to the present invention. The modified vehicle generator control device 1A differs from the vehicle generator control device of FIG. 1 in that the diodes 13 and 14 contained in the H-bridge circuit are replaced by a pair of power MOS FETs 13a and 14a, and a pair of drivers 110a and 111a, a resistance 106a, an inverter circuit 112a, an FET 212a and a pair of diodes 214a and 215a connected in series are added in correspondence with the power MOS FETs 13a and 14a. As for the diodes 13 and 14, respective body diodes of the power MOS FETs 13a and 14a are employed. The power MOS FETs 13a and 14a and the power MOS FETs 10 and 11 are switched on and off on a mutually exclusive basis, and such exclusive on/off switching of the power MOS FETs 13a and 14a are achieved by driving by the inverter circuit 112a and drivers 110a and 111a. The FET 212a and diodes 214a and 215a, which are added in correspondence with the ground side power MOS FET 11, are identical in operation to the FET 212 and diodes 214 and 215, which are added in correspondence with the power MOS, FET 11. Stated more specifically, when a high level output signal is emitted from the inverter circuit 211 while the engine is in the non-operating state, the voltage level of this output signal is lowered or stepped down by the series connected diodes 214a and 215a before the output signal is supplied to the gate of the power MOS FET 13a for causing the power MOS FET 13a to conduct. When the FET 212a conducts while the engine is in the non-operating state, the power MOS FET 14a is forcibly cut off as the power MOS FET 14a is connected via the resistance 106 to a drain of the FET 14a.

By thus replacing the diodes 13 and 14 by the power MOS FETs 13a and 14a, opposite ends of the field winding 21 are connected to the ground via the power MOS FETs 11 and 13a. With this arrangement, since the rotor of the vehicle generator is securely clamped at the ground potential, a leakage current that may occur in either of the two output terminal side power MOS FETs 10 and 14a can never flow through the rotor of the vehicle generator. Thus, the vehicle-mounted electric generator is further improved in terms of environmental resistance and reliability. Although in the arrangement shown in FIG. 4 two power MOS FETs 13a and 14a are used in place of the diodes 13 and 14 shown in FIG. 1, it is still within the scope of the present invention that the ground side diode 13 is replaced by a power MOS FET.

Obviously, various minor changes and modifications are possible in the light of the above teaching. It is to be understood that within the scope of the appended claims the present invention may be practiced otherwise than as specifically described.

What is claimed is:

1. A vehicle generator control device comprising:
a transistor chopper type exciting circuit for supplying an excitation current to a vehicle-mounted electric generator drivable by an engine of the motor vehicle, the exciting circuit including a bridge circuit having a first pair of opposing arms formed of respective power transistors and a second pair of opposing arms formed of respective diodes, one of the power transistors being connected to a ground potential of the vehicle-mounted electric generator and the other power transistor being connected to an output terminal of the vehicle-mounted electric generator, wherein when the engine is in a non-operating state, the one transistor is set in an on state and the other power transistor is set in an off state.

2. The vehicle generator control device as recited in claim 1, wherein the power transistors of the transistor chopper type exciter circuit comprises voltage-driven type power transistors.

3. The vehicle generator control device as recited in claim 1, further comprising:
operating state determination means for determining whether the engine is in an operating state or not;
drive means for setting the one power transistor in the on state; and
a standby power supply that supplies electric power to the operating condition determining means and the drive means even when the engine is in the non-operating state.

4. The vehicle generator control device as recited in claim 3, further comprising:
voltage stepdown means disposed between the drive means and the one power transistor for switching the one power transistor to the on state at a voltage lower than an output voltage of the standby power supply.

5. The vehicle generator control device as recited in claim 1, wherein one of the diodes is connected to the ground potential of the vehicle-mounted electric generator, at least said one diode comprises a body diode of a power transistor, and the power transistor having the body diode is set to an on state when the engine is in the non-operating state.

* * * * *